United States Patent [19]
Adamini

[11] Patent Number: 5,806,888
[45] Date of Patent: Sep. 15, 1998

[54] AIR BAG INFLATOR

[75] Inventor: Chris A. Adamini, Sterling Heights, Mich.

[73] Assignee: Automotive Systems Laboratory, Inc., Farmington Hills, Mich.

[21] Appl. No.: 783,885

[22] Filed: Jan. 16, 1997

[51] Int. Cl.⁶ .................................................. B60R 21/26
[52] U.S. Cl. ............................................................ 280/741
[58] Field of Search .................................... 280/741, 742, 280/736; 102/530, 531

[56] References Cited

U.S. PATENT DOCUMENTS

| | | | |
|---|---|---|---|
| 34,615 | 3/1862 | Shannon . | |
| 2,529,791 | 11/1950 | Whitworth et al. | 102/39 |
| 3,726,220 | 4/1973 | MacDonald et al. | 102/39 |
| 3,739,574 | 6/1973 | Godfrey | 60/39.03 |
| 3,797,854 | 3/1974 | Poole et al. | 280/150 AB |
| 4,109,578 | 8/1978 | Goetz | 102/39 |
| 4,296,084 | 10/1981 | Adams et al. | 423/351 |
| 4,414,902 | 11/1983 | Strasser et al. | 102/531 |
| 4,530,516 | 7/1985 | Adams et al. | 280/741 |
| 4,561,675 | 12/1985 | Adams et al. | 280/734 |
| 4,722,551 | 2/1988 | Adams | 280/736 |
| 4,943,086 | 7/1990 | Cunningham | 280/741 |
| 5,005,486 | 4/1991 | Lenzen | 102/531 |
| 5,009,855 | 4/1991 | Nilsson | 422/164 |
| 5,033,390 | 7/1991 | Minert et al. | 102/530 |
| 5,062,367 | 11/1991 | Hayashi et al. | 102/530 |
| 5,215,721 | 6/1993 | Tasaki et al. | 422/165 |
| 5,268,013 | 12/1993 | Bruncher et al. | 55/486 |
| 5,275,433 | 1/1994 | Klober et al. | 280/741 |
| 5,345,875 | 9/1994 | Anderson | 102/530 |

FOREIGN PATENT DOCUMENTS 6-201299  7/1994  Japan .

Primary Examiner—Eric D. Culbreth
Attorney, Agent, or Firm—Lyon, P.C.

[57] ABSTRACT

A filter for an air bag inflator has multiple layers of pierced sheet metal including a vacant plenum therebetween followed by an expanded metallic mesh filter.

2 Claims, 1 Drawing Sheet

AIR BAG INFLATOR

BACKGROUND OF THE INVENTION

The present invention relates generally to gas inflators for automotive passenger restraint systems, and more specifically, to a gas filter for improved filtration of solids and cooling of combustion gases.

Heat, as well as particulates, in the combustion of gases produced by a pyrotechnic inflator of a vehicle occupant restraint system must be attenuated prior to discharge thereof into the passenger compartment of a vehicle. While the industry has been successful in meeting current standards through the use of azide propellants, many azide propellants have proven unsatisfactory due to lower gas yields and to the extreme toxicity of azides during manufacture of gas generants. As such, the industry has turned to non-azide propellants that provide large amounts of non-toxic gases and reduced toxicity during manufacture. The advent of non-azide propellants, however, has complicated particulate/gas attenuation due to high combustion temperatures, and due to the characteristics of particulate combustion products produced by non-azide propellants. Furthermore, rapid cooling provided by conventional filters results in incomplete combustion and excess levels of toxic gases such as carbon monoxide and nitrogen (II) oxide. Thus, there is a requirement for an inflator that utilizes a non-azide propellant yet meets all current and projected standards for heat attenuation, toxic gas levels, and particulate filtration from the gas produced.

SUMMARY OF THE INVENTION

The aforesaid problem is solved, in accordance with a preferred constructed embodiment of the present invention, by a multistaged filter, used in conjunction with a non-azide propellant, comprising a novel array of pierced sheet metal and expanded metal mesh. Upon combustion of the gas generant, the propellant gases are gradually cooled and filtered as they pass through a vacant plenum disposed between two pierced tubes, thence through a metallic mesh filter, and thence through the inflator housing.

DETAILED DESCRIPTION OF THE PREFERRED EMBODIMENT(S)

Figure 1:
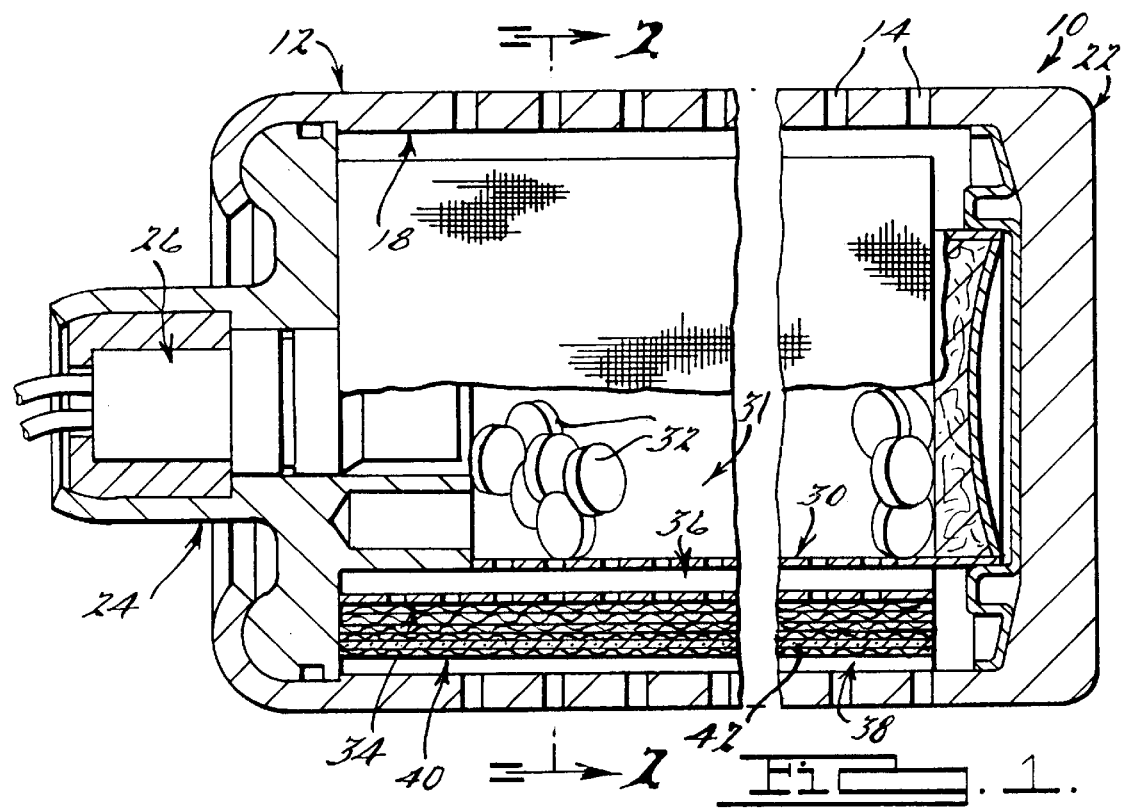
FIG. 1 is a longitudinal cross-sectional view of an automotive air bag inflator constructed in accordance with the instant invention.
Figure 2:
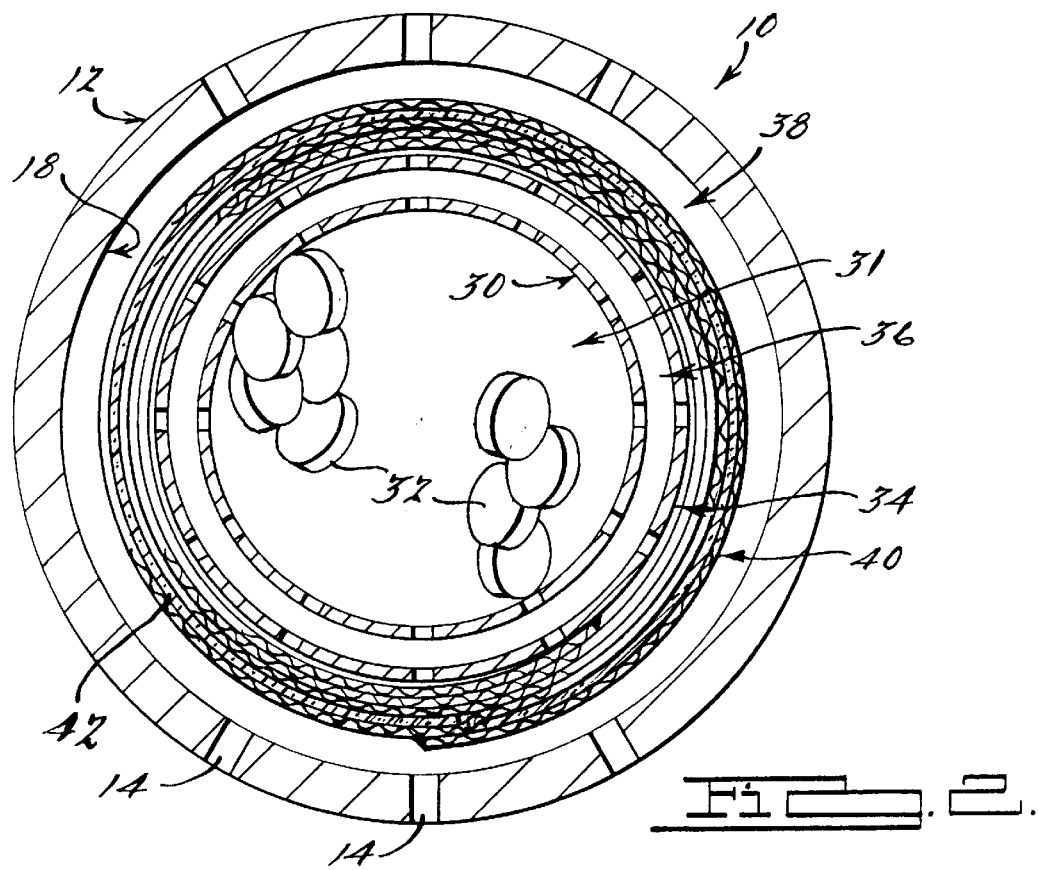
FIG. 2 is a cross-sectional view of an automotive air bag inflator constructed in accordance with the instant invention.

As seen in the drawings, an inflator 10 having particular utility for use in, for example, an automobile occupant restraint system, comprises a cylindrical housing 12 having a plurality of gas discharge orifices 14 disposed in a radially outer wall 18. The housing 12 has an integral end closure 22 at one end and a closure 24 at an opposite end thereof that is crimped in place. The end closure 24 accepts a conventional igniter 26, providing an ignition means for the propellant charge within the inflator 10.

In accordance with the present invention, a multilayered filter extends radially inward from outer wall 18, or radially outward from a perforated propellant tube 30. The perforated propellant tube 30 defines a propellant chamber 31 that extends longitudinally of the housing 12 for containment of non-azide propellant grains 32. A second perforated propellant tube 34, in spaced relation to propellant tube 30, defines a vacant radially extending plenum 36, between the propellant tube 30 and the second tube 34. A second plenum 38 is defined between the second tube 34 and the outer wall 18. In the preferred embodiment, a layer 40 of 16–20 expanded metal mesh, having holes the diameter of 0.023 in. (≈0.06 cm.), obtainable from, for example, Wayne Wire Cloth, Hillman, MI, is radially constrained within plenum 38. If desired, a ceramic filter shown schematically at 42, for example Unifrax #204LE, obtainable from Unifrax Corporation, Niagara, N.Y., may be intermediately disposed within expanded metal mesh 40 for additional cooling and filtration.

In accordance with a preferred constructed embodiment of the invention, the perforated tubes 30 and 34 each comprise pierced 0.027 inch carbon steel sheet metal. Piercing of the tubes increases the total radial thickness thereof to 0.037 inches. The aggregate open area created by the punctures within tubes 30 and 34 should approximate 32% of the total surface area of each tube. When punching the metal to create the randomly placed perforations, burrs are allowed within the holes created; however, care should be taken to ensure that no burrs protrude into the inner diameter of tube 30. The inner diameter of propellant tube 30 should be the punch side, thereby ensuring a smooth inner surface. Tube 34 may be perforated in the same manner. The multilayered filter is easily formed into an assembly as, for example, by rolling and welding as taught in commonly owned U.S. Pat. No. 5,547,217.

In operation, combustion gas flows radially outward from propellant chamber 31, thence radially outward and circumferentially through plenum 36 wherein entrained liquids within the gas are solidified upon contact with the cooler surface of the second perforated tube 34, and then past the circumferentially directed surfaces of the second perforated tube 34. The gases then radially pass through the expanded metallic mesh 40 and exit the generator 10 through the discharge nozzles 14 of the radially inner wall 18. A significant portion of the heat of combustion, as well as the large particulates in the propellant 32, are absorbed and filtered by the aforesaid structure.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. A gas generator comprising:
    a housing having a plurality of gas discharge nozzles;
    a propellant chamber located within said housing for holding a propellant charge, said chamber having a plurality of apertures which are in fluid communication with said plurality of gas discharge nozzles;
    means for igniting said propellant charge;
    a multistage filter in fluid communication with said plurality of apertures and said plurality of gas discharge nozzles, said multistage filter comprising:
        a first filtration stage comprising a perforated propellant tube forming said chamber, a second perforated tube, and a vacant plenum formed between said perforated propellant tube and said second perforated tube; and a second filtration stage comprising a wire mesh metallic filter, wherein gases produced by ignition of said propellant charge flow through said plurality of apertures in a substantially radial direction into and through said vacant plenum for cooling and filtration thereof, thence through said wire mesh metallic filter for further cooling and filtration, and thence exiting said gas generator through said plurality of gas discharge nozzles.

2. A gas generator as claimed in claim 1 further comprising a ceramic filter intermediately disposed within said wire mesh metallic filter, for further cooling and filtration.

* * * * *